United States Patent [19]

Dumont

[11] Patent Number: 4,492,216

[45] Date of Patent: Jan. 8, 1985

[54] OVEN WITH AIR CONVECTION COMBUSTION, MORE PARTICULARLY FOR BAKEHOUSES

[75] Inventor: Philippe Dumont, Montreuil, France

[73] Assignee: Dumont S.A., Montreuil, France

[21] Appl. No.: 440,337

[22] Filed: Nov. 9, 1982

[30] Foreign Application Priority Data

Nov. 13, 1981 [FR] France ................ 81 21237

[51] Int. Cl.[3] .................. F24C 1/00; A47J 00/00; F27B 9/04
[52] U.S. Cl. .................. 126/21 A; 126/19 R; 99/352; 99/447; 99/479; 432/152; 432/199
[58] Field of Search .................. 432/199, 152, 162; 126/21 R, 21 A, 273 R, 338, 113, 39 L, 41 A, 350 B; 99/447, 352, 467, 479; 122/367 R, 367 PF

[56] References Cited

U.S. PATENT DOCUMENTS

| | | | |
|---|---|---|---|
| 4,039,278 | 8/1977 | Denholm | 126/21 A |
| 4,062,983 | 12/1977 | Roderick | 126/21 A |
| 4,202,259 | 5/1980 | Johansson | 99/352 |
| 4,322,204 | 3/1982 | Voegtlin et al. | 99/447 |

Primary Examiner—Samuel Scott
Assistant Examiner—G. Anderson
Attorney, Agent, or Firm—Holman & Stern

[57] ABSTRACT

An oven with air convection combustion, particularly for bakehouses (bread, pastries, cakes), to achieve considerable economy of energy and to improve efficiency has primary and secondary air circuits sealed and closed, the secondary air being heated in ducts surrounding the fire-box and exhaust conduits and admitted into the baking chamber through adjustable nozzles. The cooled secondary air leaving oven is recycled by the a turbine. A vapor generator is formed from metal tubes extending into the exhaust gas conduit and the vapor is fed to a ramp pierced with calibrated holes disposed vertically in the baking chamber through which it is disposed into the chamber after being saturated by a water injector.

6 Claims, 8 Drawing Figures

OVEN WITH AIR CONVECTION COMBUSTION, MORE PARTICULARLY FOR BAKEHOUSES

BACKGROUND OF THE INVENTION

1. Field of the Invention

The present invention relates to an oven with air convection combustion particularly for bakeries (more especially bread, pastries and cakes) and its principal aim is to achieve economies of energy and to improve the quality of the baking.

2. Description of the Prior Art

A baker's oven is already known, for example from French Pat. Nos. 2 247 876 and 2 247 877 in which the baking takes place in a hot air stream driven by a fan through a duct, the baking air being moistened with water vapor (French Pat. No. 2 285 834); it has also been proposed, in French Pat. No. 1 565 123, to use closed circuit smoke conduits for heating the combustion chamber.

BRIEF SUMMARY OF THE INVENTION

To obtain the desired economy, the oven of the invention comprises a closed circuit for secondary air heated by contact with the conduits surrounding the fire-box and the chimney for discharging the gases from the burner, as well as a turbine for pulsing the secondary air in order to reinject it into the circuit, and the production of vapor is provided by a generator which recovers the heat from the discharge gases, while producing humid secondary air which is centrifuged by the turbine which separates the vapor from the air and allows the vapor to be recovered at the periphery of the swirl and to be removed through an adjustable valve.

With these arrangements, the heat from the burner can be used to a maximum, since only the gases from the combustion are discharged to the outside after giving up their heat in the air ducts and to the vapor generator.

To control the quality of the baking, the oven of the invention is adapted so that the dry vapor cannot penetrate into the baking enclosure; for this, a diffuser saturates the dry vapor produced by the generator.

Centrifugation of the air-vapor mixture allows great accuracy in controlling the percentage of vapor in the air and gives the possibility of obtaining the desired quality and crust thickness.

The temperature curve of the oven is more stable because the introduction of vapor supplied by the generator does not cause the temperature of the baking chamber to vary appreciably, whereas the introduction of water for producing the vapor in known ovens causes lowering of this temperature and since the removal of the vapor centrifuged by the turbine allows the minimum of heat to be removed from the air-vapor circuit.

The oven of the invention is formed by a closed enclosure comprising the baking oven properly speaking, the firebox and its burner, the conduits for exhausting the burnt gases and ducts surrounding these conduits; in these ducts flows in a closed circuit the secondary baking air of the oven heated by the exhaust conduits and the secondary air leaving the oven and recycled by a turbine with horizontal axis.

In the ducts surrounding the gas exhaust conduit are provided plunging tubes filled with metal scraps or similar material and at the top of which are housed adjustable water injectors: this water is vaporized in contact with these scraps heated by the primary air and the dry vapor produced is fed to a vertical distributing ramp provided in the oven with interpositioning of a water injector which cools the vapor and causes it to pass below its dew point, which considerably improves the quality of the baking.

The air heated in the ducts in contact with the exhaust conduits is distributed in the baking chamber by adjustable nozzles disposed at the different levels of the bread supporting carriages. This air escapes through nozzles opposite the preceding ones and is reintroduced into the circuit by the action of a horizontal axis turbine fixed to the side of the enclosure.

The baking plate is mounted in the oven pivotable about a vertical median axis and it is actuated by a motor.

BRIEF DESCRIPTION OF THE DRAWINGS

Important characteristics of this oven will be described in greater detail hereafter with reference to the accompanying drawings wherein.

DETAILED DESCRIPTION

Figure 2:
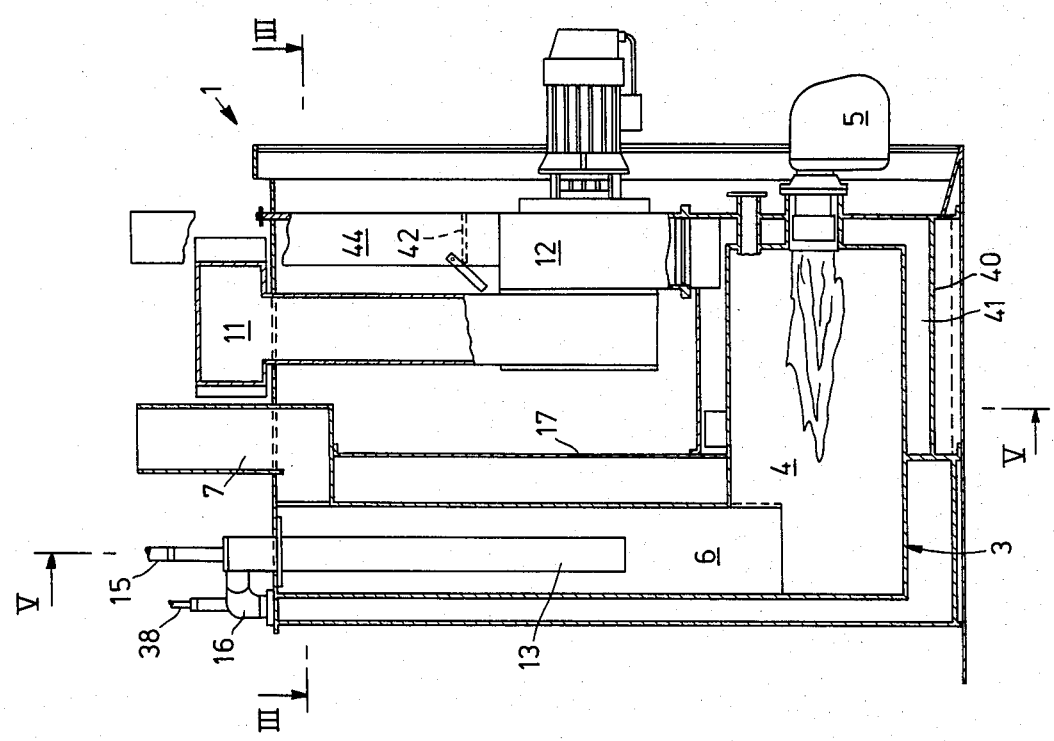
FIG. 2 is a vertical sectional view taken along line II—II of FIG. 1.
Figure 1:
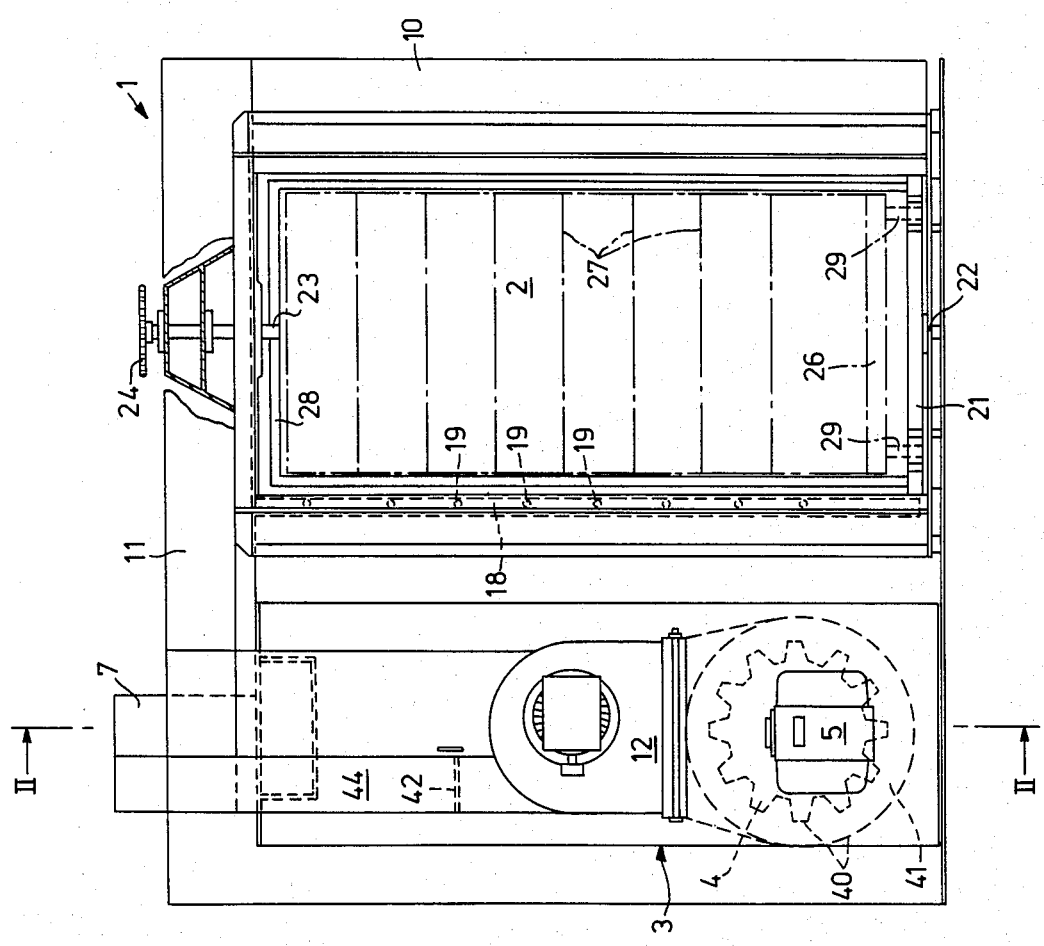
FIG. 1 is a front elevational view of the oven of the invention without its door.
Figure 3:
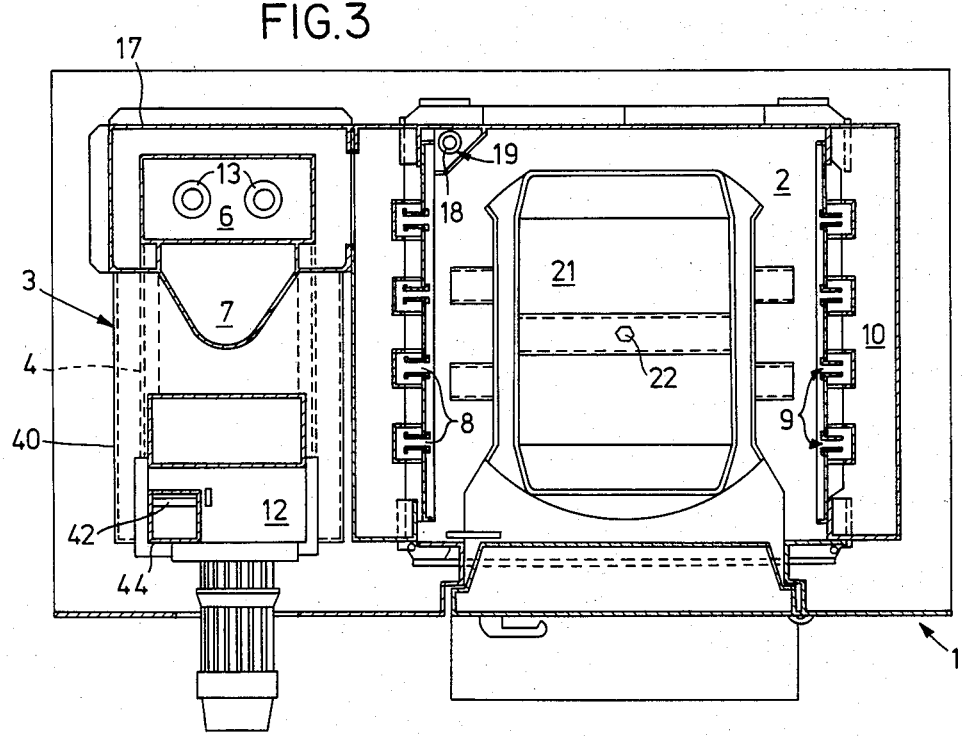
FIG. 3 is a horizontal cross-sectional view taken along III—III of FIG. 2.
Figure 4:
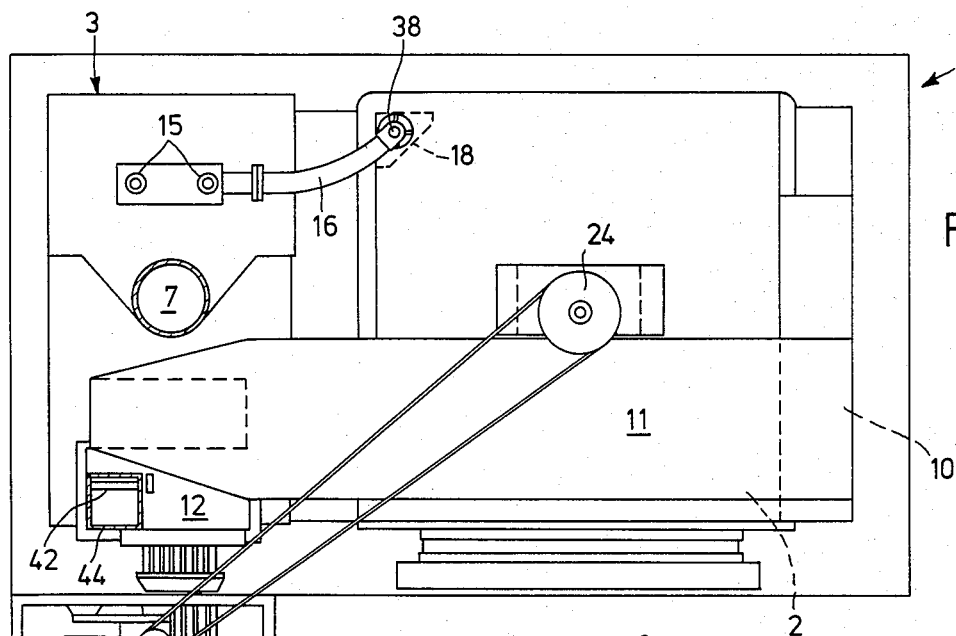
FIG. 4 is a top plan view of the oven.

The chamber is of a current type, that is to say that it comprises a compartment forming the baking oven properly speaking, a space receiving the fire-box, the gas exhaust conduit and ducts for circulation of the convection air.

It has been designed so as to achieve a minimum loss of heat and for this the exhaust conduits serve for heating the secondary air and the vapor generator and this hot primary air distributed in the baking chamber is removed through ducts in the form of cooled secondary air which is recycled in a closed circuit by a turbine.

This bakehouse oven comprises a body 1, having a parallelepipedic or other shape, comprising a compartment 2 forming the baking oven properly speaking and a compartment 3 comprising the fire-box 4, in the form of a double-walled star-shaped tube 40 to the end of which is connected burner 5; the combustion gases are removed from the fire box through a vertical conduit 6 opening through a vent 7 to the outside. The firebox 4 and the ascending conduit 6 are surrounded by a sealed duct 17 in which the secondary heating air is brought to the baking temperature (about 200°–300° C.) by contact with the conduit for the combustion gases 6. This air is distributed in chamber 2 through adjustable nozzles 8 disposed over the whole height of the oven. This hot air is removed from the chamber in the form of cooled secondary air through nozzles 9 disposed on the side of the baking oven 2 on the side opposite the admission nozzles 8. This cooled air is then fed into a vertical duct 10 into which emerges the conduit 11 of a horizontal axis turbine 12 which recycles this air the space 41 around the fire-box.

This air then flows in a closed circuit and there is practically no lost heat; only the heat from the combustion gases which has not been exchanged with the ambient air in duct 7 of the primary air circuit is discharged through chimney 7.

This heat of conduit 6 is also used for producing the vapor indispensable for suitably baking dough balls. To this end, tubes 13, two in number for example, plunge vertically into conduit 6; they are filled with metal scraps or similar material which are brought to a high temperature by contact with the exhaust gases. At the top of these tubes are disposed externally water injectors 14. These injectors, in the form of needle valves for example, adjust the intake of water fed through conduits 15. The dry vapor escapes through conduit 16 which opens into ramp 18 which extends vertically in the corner of the baking oven and in which it only penetrates after passing through a water curtain created by injector 38, which lowers the temperature thereof and brings it below its dew point. This ramp distributes the vapor over all the plates of the oven through calibrated holes 19. The baking chamber comprises a rotary turntable 21 on which is placed the carriage 26 carrying the dough balls (not shown). Turntable 21 pivots about an axis 22 and is connected to the drive shaft 23, driven by a pinion 24 of a motor driven reduction unit 25, by means of a gantry 28 which straddles the whole carriage 26.

This carriage 26 comprises in the direction of its height the dough ball supports 27 and is provided with wheels 29.

Depending on the dimensions of the baking chamber may be equipped with one, two or four carriages 26.

Figure 6:
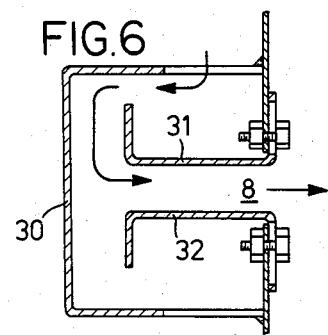
FIGS. 6 and 7 are detail cross-sectional views of the primary and secondary air nozzles.

The secondary air inlet nozzles 8 are in the form of baffles formed by three U shaped elements 30, 31, 32, the latter two being adjustably spaced apart as shown in FIG. 6.

Figure 7:
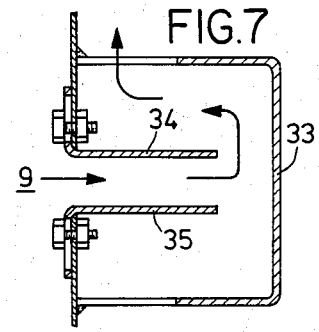
Figure 5:
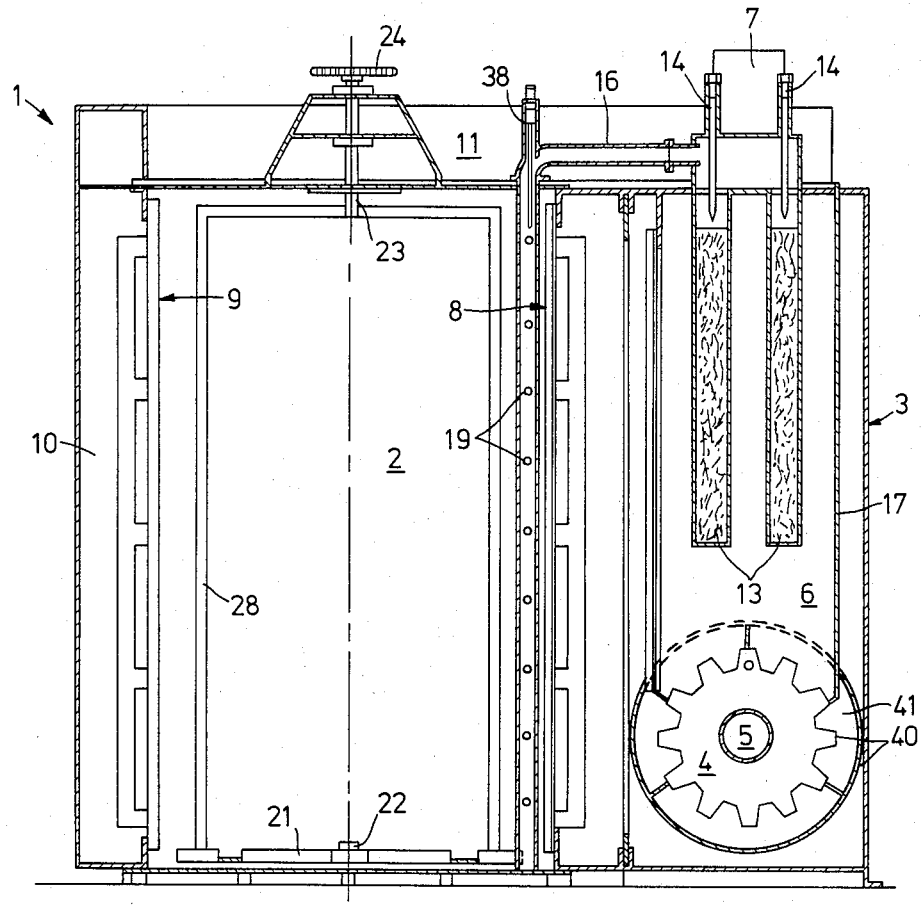
FIG. 5 is a vertical sectional view taken along line V—V of FIG. 2.

The exhaust nozzles are also in the form of baffles formed by a U shaped piece 33 and two inverted L shaped pieces 34 and 35 spaced adjustably apart as shown in FIG. 7.

Figure 8:
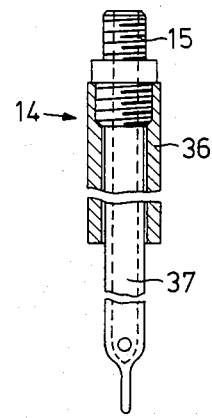
FIG. 8 is a detail cross-sectional view on a larger scale of the water injectors.

FIG. 8 shows on a larger scale an injector 13 formed by a tube 36 connected to the water conduit 15 in which is housed a pipette 37 whose delivery rate is controlled by an electromagnetic valve; injector 38 may be formed in any way; these injectors start up simultaneously but the duration of operation may be different so as to obtain continually the desired vapor quality.

The production of the vapor is provided by generator 13 which recovers the heat from the exhaust gases and turbine 12 which centrifuges the moist secondary air and allows the vapor to be recovered at the periphery of the swirl or volute and to be removed through the adjustable valve 42 situated in conduit 44, thus reducing the heat loss. With this centrifugation of the air-vapor mixture and adjustment of the generator, a desired quality and thickness of crust may be obtained.

By way of example, with an oven 2 m × 1 m × 1.5 m, 120 baguettes (a long thin stick of French bread) weighing 250 g may be treated in 18 minutes with an oven temperature of 220° C.

The structural details described are naturally subject to variations depending on the dimensions of the oven and its purpose, the essential part of the invention residing in the economies of energy and improvement of yield by the above described means.

I claim:

1. A baking oven with air convection combustion comprising: a baking chamber having walls and a door opening; a fire-box; a burner operatively disposed in said fire-box; a vertical primary exhaust duct connected to said fire-box for exhausting the hot gases therefrom and forming a primary circuit therewith; a closed heating duct adjacent the baking chamber surrounding said fire-box and said exhaust duct and forming a secondary circuit for providing secondary air heated to about 200°-300° C. by contact with said exhaust duct and fire-box; a plurality of adjustable input nozzles mounted on the oven in spaced relationship over the height of and on one side of the baking chamber operatively connecting said heating unit to said chamber for conducting air from said secondary circuit to said chamber; adjustable exhaust nozzles mounted on the side of said baking chamber opposite the intake nozzles for exhausting said chamber; a chamber exhaust duct operatively connected to said exhaust nozzles for collecting the secondary air from said exhaust nozzles and returning it to said heating duct; a turbine mounted on a horizontal axis situated above said fire-box and operatively connecting said chamber exhaust duct to said heating duct for recycling said secondary air; a vapor producing humidifier means; a vertical ramp mounted within said baking chamber adjacent the input nozzle side thereof; a humidifier duct connecting said humidifier means with said ramp; and bore holes disposed along said ramp to inject vapor produced by said humidifier means into said baking chamber in the vicinity of said input nozzles.

2. The baking oven as claimed in claim 1 wherein said humidifier means comprises: a dry vapor generator disposed in said primary exhaust duct and a water diffuser operatively disposed in said humidifier duct to saturate said dry vapor before injected through said bore holes.

3. The baking oven as claimed in claim 1 wherein said fire-box comprises: a star-shaped double-walled tubular member, the space between said double walls being connected to said heating duct for heating secondary air recycled by said turbine.

4. A baking oven as claimed in claim 1 wherein: said humidifier means comprises at least one tubular vapor generator disposed within said primary exhaust duct, metal scraps substantially filling said tubular vapor generator; and at least one water injector operatively mounted in said tubular generator to inject water thereinto.

5. A baking oven as claimed in claim 1 wherein each of said adjustable nozzles comprises baffle plates mounted so that the distance between them is adjustable.

6. A baking oven as claimed in claim 4 wherein two of said tubular vapor generators are provided; said water injectors are adjustable; and further comprising a vapor exhaust duct connected tangentially to said turbine so that vapor in the secondary air of said secondary circuit is discharged by centrifugation in said turbine into said vapor exhaust duct, and a valve operatively mounted in said vapor exhaust duct to control the escape of vapor therethrough.

* * * * *